Nov. 19, 1963 B. J. WARMAN 3,111,659

TRANSLATING APPARATUS AS EMPLOYED IN AUTOMATIC TELEPHONE AND LIKE SYSTEMS

Filed July 11, 1957 7 Sheets-Sheet 1

Nov. 19, 1963 B. J. WARMAN 3,111,659

TRANSLATING APPARATUS AS EMPLOYED IN AUTOMATIC TELEPHONE AND LIKE SYSTEMS

Filed July 11, 1957

7 Sheets-Sheet 2

Nov. 19, 1963 B. J. WARMAN 3,111,659

TRANSLATING APPARATUS AS EMPLOYED IN AUTOMATIC TELEPHONE AND LIKE SYSTEMS

Filed July 11, 1957 7 Sheets-Sheet 3

United States Patent Office 3,111,659

Patented Nov. 19, 1963

3,111,659

TRANSLATING APPARATUS AS EMPLOYED IN AUTOMATIC TELEPHONE AND LIKE SYSTEMS

Bloomfield James Warman, Charlton, London, England, assignor to Associated Electrical Industries (Woolwich) Limited, London, England, a British company Filed July 11, 1957, Ser. No. 671,167
Claims priority, application Great Britain July 12, 1956
6 Claims. (Cl. 340—347)

Figure 1:
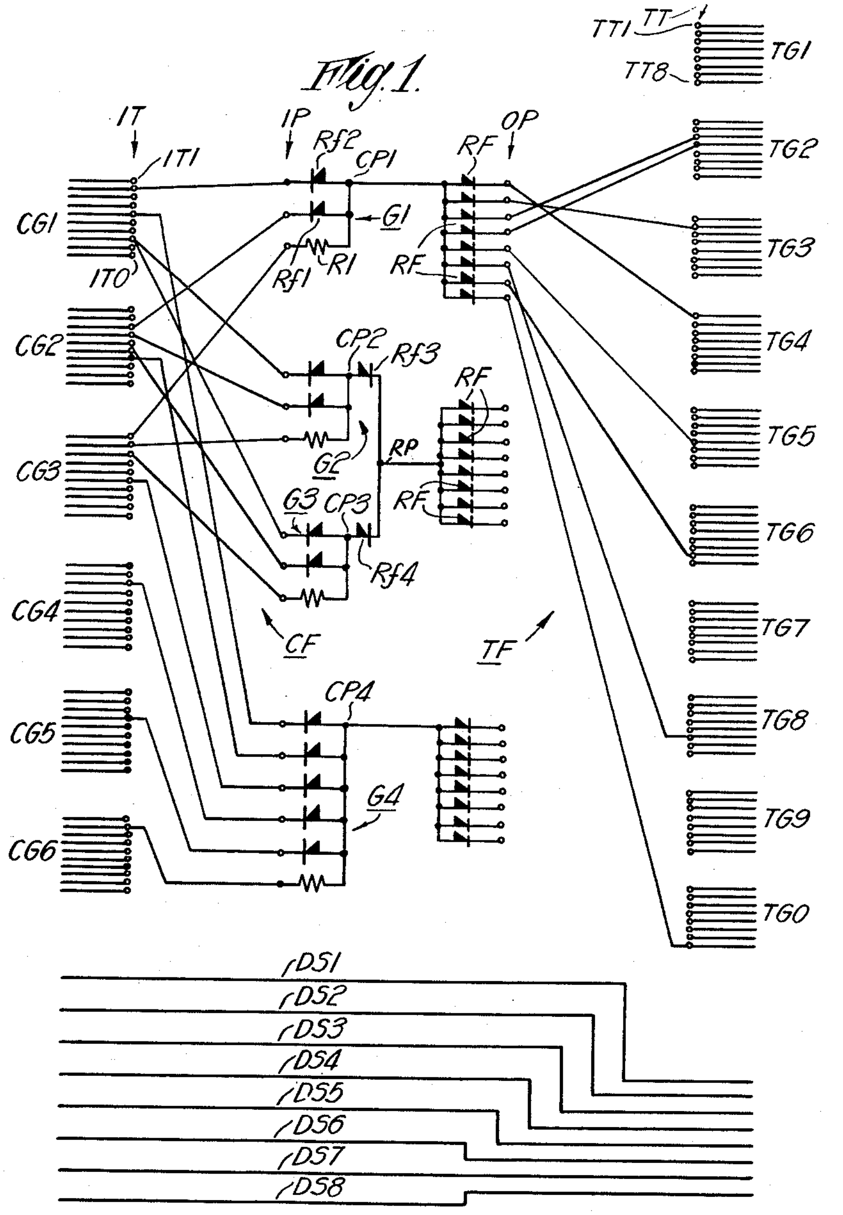

This invention relates to translating apparatus such as are employed in automatic telephone and like systems and by which input codes each made up of a number of what will be herein termed code digits can be translated into usually but not necessarily different output codes, or translations, each made up of a number of what will be herein termed translation digits.

In automatic telephone systems such translating apparatus is often employed for providing at an originating exchange, in response to a output code designating another exchange which serves a subscriber being called, a corresponding translation, that is, output code, relating to the routing of the call from the originating exchange to the other exchange. Where the translating apparatus has to serve a large telephone area of, say, about five hundred exchanges, in which case each exchange is usually designated by a decimal three-digit input code for which the translating apparatus may have to provide a corresponding number of translations. For a national dialling telephone system, namely in which a number on an exchange in one area can be dialled directly by a subscriber on an exchange in another area without intervention of an operator, more than a thousand exchanges may be involved and in such circumstances each exchange may be designated by an input code comprising from three to six decimal digits. The number of translation digits in a translation, usually also decimal digits, depends on the routing requirements and may for example be six to eight.

Equipment is commonly associated with the translating apparatus to store the digits of an input code designating a particular called exchange and in response thereto to mark, that is impart a distinctive potential to, a combination of wires unique to such input code, which markings are gated to mark at the input side of the translating apparatus a particular input so-called code point individual to the particular code received, there being one such code point for each input code for which the apparatus can provide a translation. In a form of translating apparatus at present employed, a plurality of what will be called translation terminals, each pertaining to a particular value of a particular translation digit, is provided on the output side of a translation field over which the code points are cross-coupled with the translation terminals in such a way that the marking of any code point will result in a corresponding combination of translation terminals, one for each translation digit, being marked to represent the values of the translation digits constituting the translation for the received input code. These markings on the translation terminals can then be converted by suitable circuits into appropriate routing signals, the translation digits commonly being taken one at a time for this conversion and subsequent utilisation.

In the form of translating apparatus just described, the cross-coupling between the code points and the translation terminals is often effected by way of coding elements such as cold-cathode amplifier tubes provided individually for the code points and included between each code point and the translation field. The number of such tubes required is therefore the same as the number of input codes for which the apparatus can provide translations, and where this number runs into thousands the arrangement is obviously costly as regards the number of such tubes required.

It is an object of the present invention to provide translating apparatus which is more economical in the number of components required and which can, moreover, readily be used to provide the translation digits of a translation one at a time.

According to the invention, apparatus for translating input codes each made up of a number of code digits into translations, that is output codes, each made up of a number of translation digits comprises, a translation cross-connection field, a number of code points at the input side of said field, there being one code point for each different input code, a number of groups of translation terminals at the output side of said field, each group pertaining to a different translation digit value and including a translation terminal in respect of each translation digit capable of having such value, cross-connections in said field affording connection from the code point for any particular input code to each of those translation terminals which correspond to the translation digits of a translation for that input code in the groups pertaining to the respective values of these digits, input circuit means responsive to a received input code to mark, that is impart a distinctive potential to, the corresponding code point, and a plurality of output circuits one for each of said group of translation terminals, each including amplifying means having input connections individually extending thereto from the several translation terminals in the appertaining groups, together with means for selectively inhibiting all of said amplifier input connections except those connected to translation terminals relating to a particular translation digit required at any time whereby on receipt of an input code for translation, an output will be obtained only from the amplifying means then having an uninhibited input connection from a marked translation terminal, which output accordingly represents the value of the required translation digit of the translation.

With the present invention therefore, the amplifying means associated with each group of translation terminals has one input connection in respect of each of the several translation digits that are required to make up the translations. In other words, for the number of numerals which constitute a translation there is a corresponding number of translation terminals in each group. The amplifying means themselves, like the groups of translation terminals, correspond respectively to the possible values (for instance 0 to 9 in the case of decimal digits) which any translation digit may have. In response to a translation terminal in at least one of the translation terminal groups being marked for a marked code point to which it is connected across the translation field, the effect of the inhibiting means is to permit the resulting translation to be taken one translation digit at a time, that is the numerals constituting the translation are abstracted from the translating apparatus in turn. The actual translation digit selected at any time is determined by the only uninhibited input connection of each of the amplifying means and the value of that translation digit is determined by which of the several amplifying means has a marking applied to its uninhibited input connection from the relevant translation terminal and can therefore produce an amplified output. This output can then be stored in a common store, constituted for instance by relays or cold-cathode tubes, which need only provide for the storage of a single digit.

Also, the provision of amplifying means on the output side of the translation field renders the markings appearing on the translation terminals more readily recognizable in the circuits utilizing the translation digits, without requiring a multiplicity of amplifier tubes at the input side of the translation field as heretofore.

In carrying out the invention, for which it is contemplated to employ coincidence gating circuits, such as resistance-rectifier gates, for effecting the marking of the relevant code point in response to receipt of an input code for translation, it is preferred to use current amplifying means incorporating saturable reactors or pulse transformers having input windings (that is, the control windings in the case of saturable reactors) connected to respective translation digit terminals. The amplifying means for each digit value of the translation digits may then include either a single saturable reactor or pulse transformer having a plurality of input windings (corresponding in number to the number of digits that may have such value in a translation) connected to the relevant translation digit terminals, or a plurality of saturable reactors or pulse transformers (likewise one for each digit capable of having the value concerned) each having a single input winding connected to the relevant translation digit terminal. At present it is envisaged that saturable reactors each having a single input winding will be best for carrying out the invention.

Figure 2:
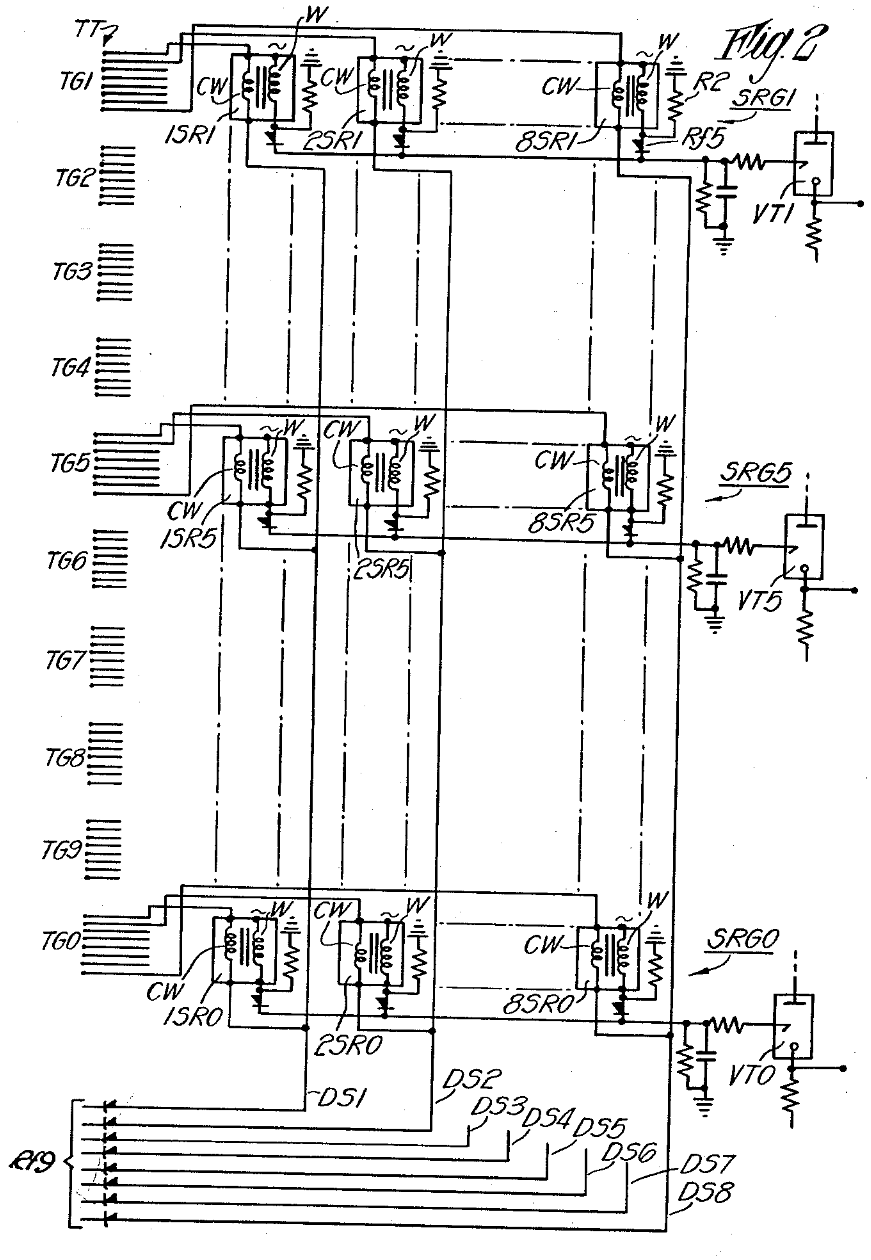
Figure 3:
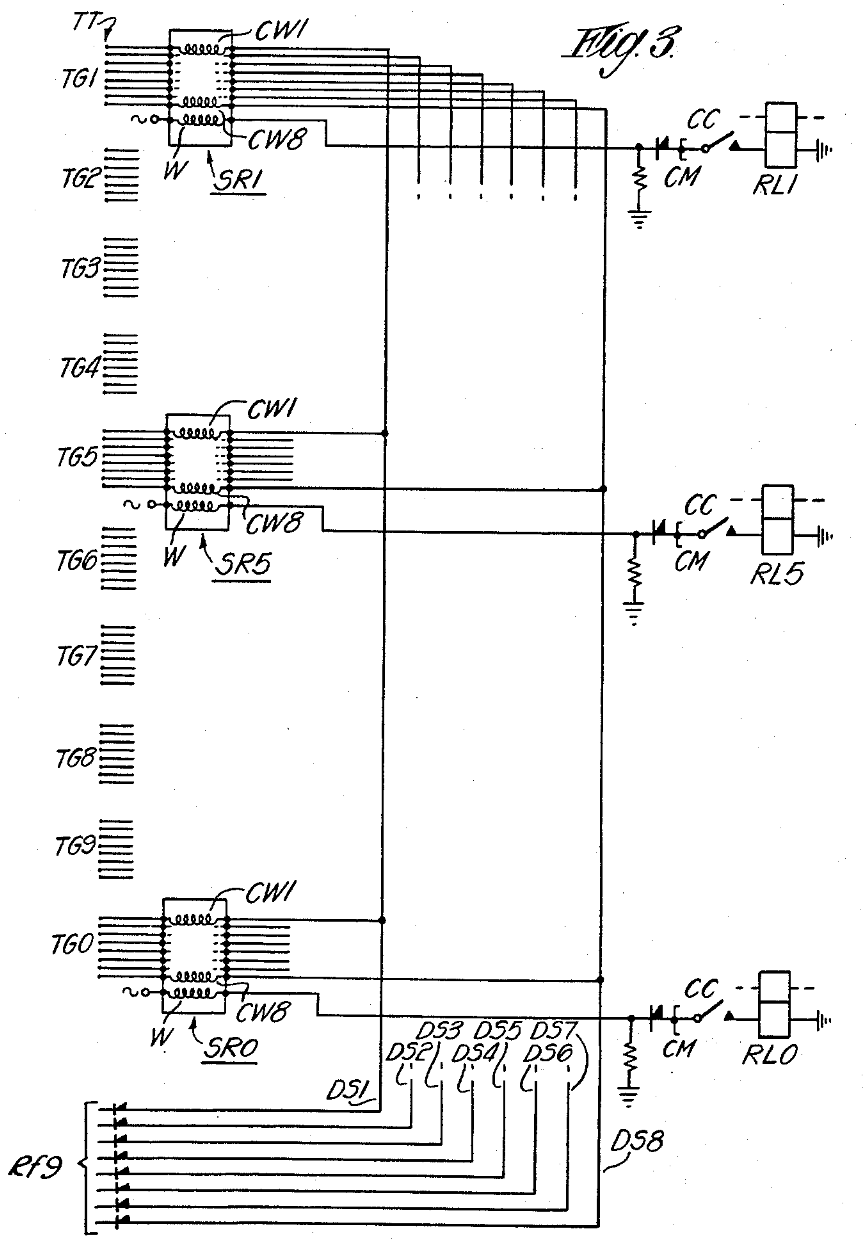
Figure 4:
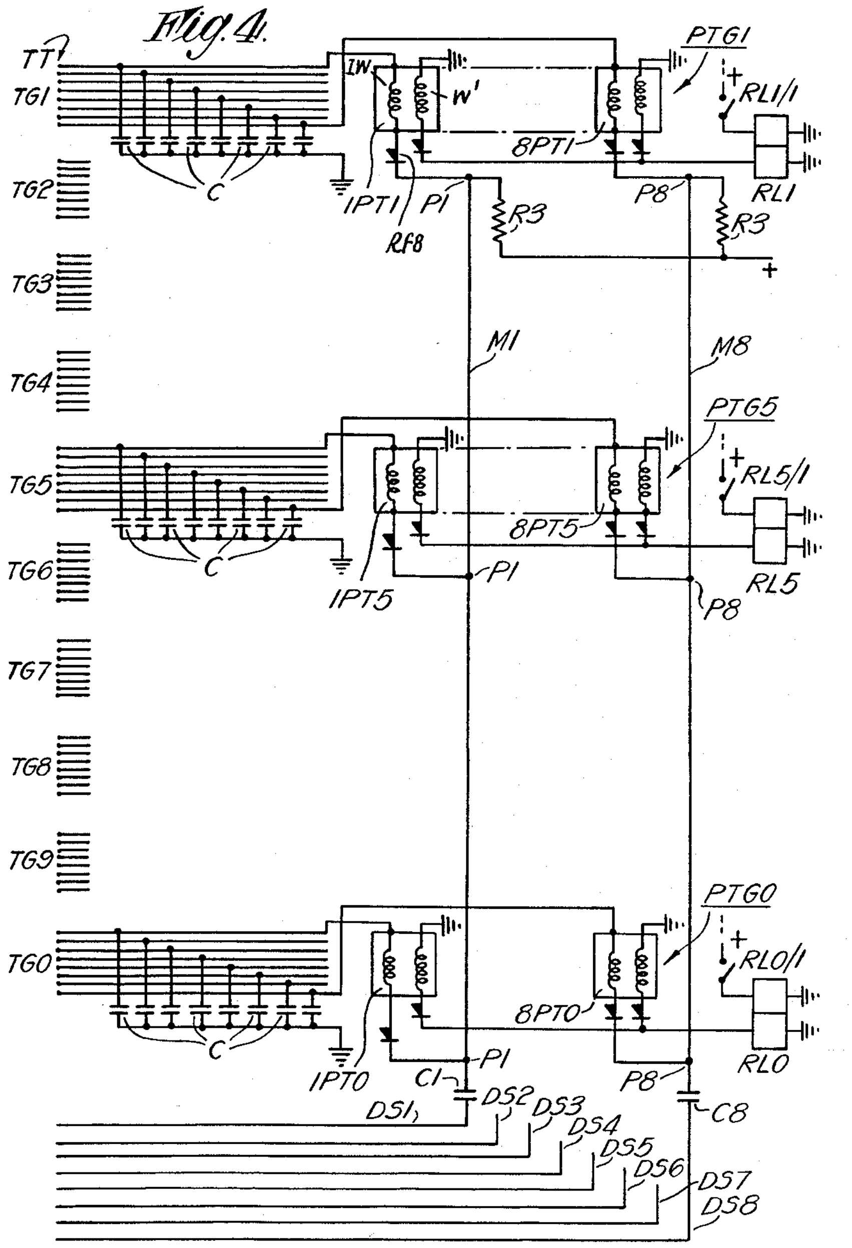
Figure 5:
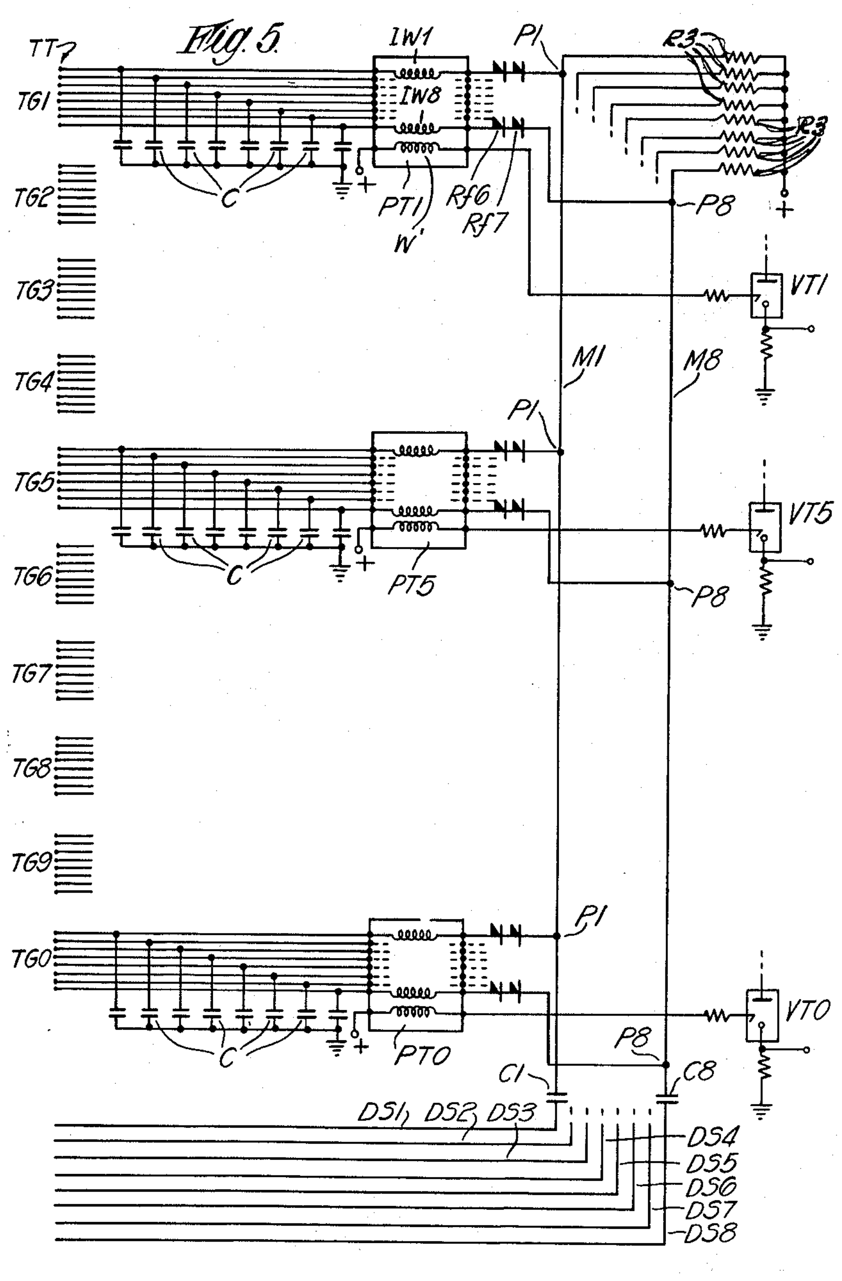
Figure 6:
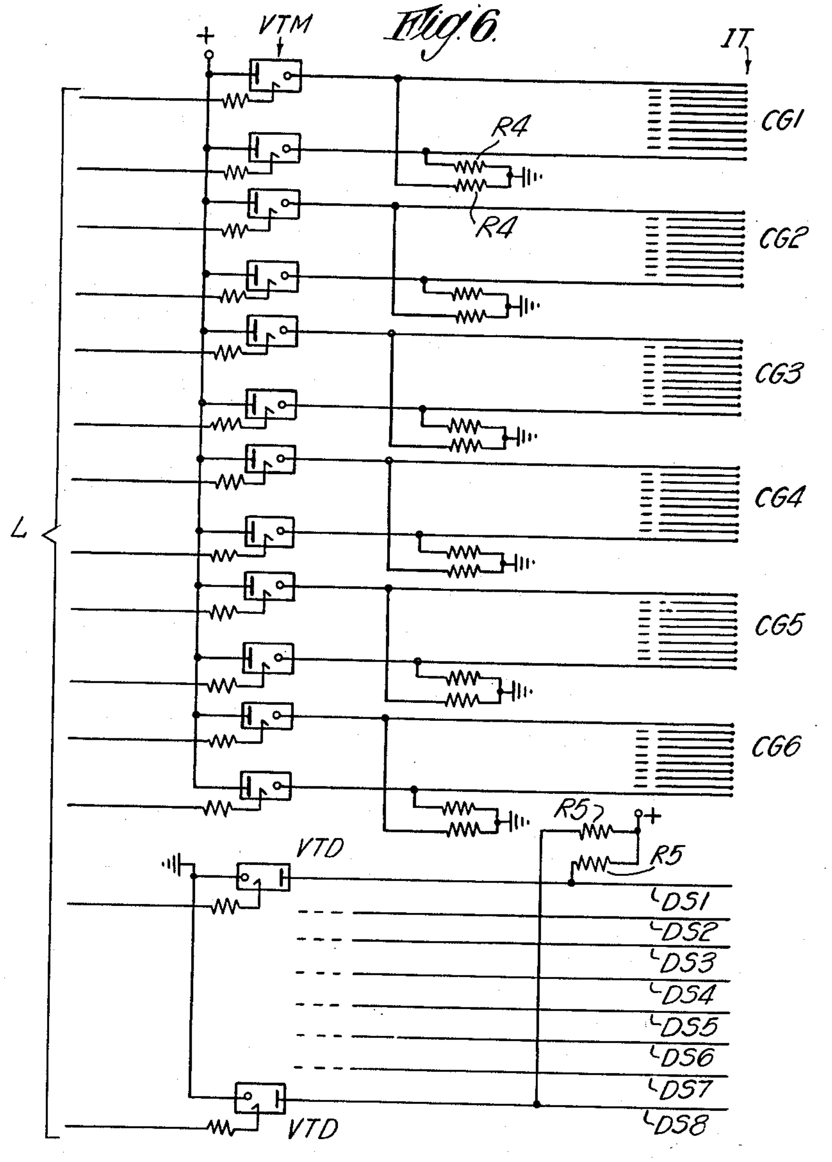
Figure 7:
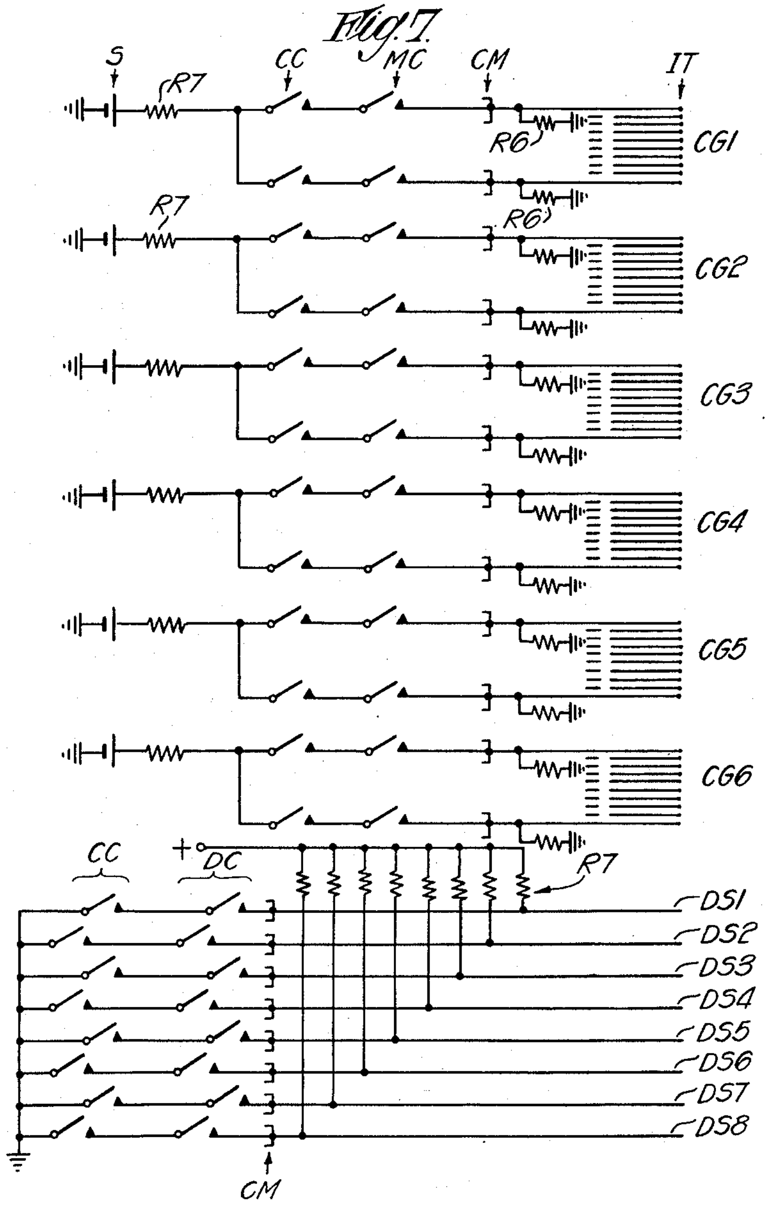

In further explaining the invention and various subsidiary features thereof, reference will now be made to the accompanying drawings in which:

FIG. 1 shows a cross-connection field provided between the code points and the translation terminals and between the code points and input terminals at which input codes are received for translation;

FIGS. 2–5 illustrates various forms which the output circuits referred to may take, FIGS. 2 and 3 employing saturable reactors as the amplifying means in the output circuits whereas FIGS. 4 and 5 employ pulse transformers; and FIGS. 6 and 7 illustrate two possible forms of code receiving circuits for marking the input terminals in accordance with a received input code.

Any one of FIGS. 2–5 can be placed at the right hand side of FIG. 1 to give an overall representation of translating equipment conforming to the invention.

In order not to overburden the drawings with repeated detail, the figures have been abbreviated by showing only certain typical elements to represent groups of such elements connected similarly to those actually shown in the group. To indicate where such abbreviation has been effected, the elements of an abbreviated group will be identified in the text by the words "such as" prefixed to the reference characters appended in the drawings to the elements actually shown.

It will be assumed by way of example that the translating equipment has to provide translations of up to eight decimal digits, one digit at a time, for exchange designation input codes of either three or six decimal digits each. On this assumption, and referring to FIG. 1, translating apparatus conforming to the invention comprises:

Sixty input terminals IT divided into six equal groups, CG1 . . . CG6, of which each group relates to a particular code digit of an input code while each of the ten terminals IT1 . . . IT0 in a group relates to a particular value (1, 2 . . . 9, 0) of the code digit to which its group relates;

A number of code points such as CP1 . . . CP4 equal to the total number of different input codes for which translation is required;

And eighty translation terminals TT divided into ten equal groups TG1 . . . TG0 each of which relates to a particular value (1, 2 . . . 9, 0) of translation digit while each of the eight terminals TT1 . . . TT8 in a group relates to a different translation digit having the value to which the group itself relates: for instance the terminal TT3 in group TG2 corresponds to a value of two for the third digit in a translation. There are also eight digit selection wires DS1 . . . DS8 of which one is marked at a time to indicate which particular translation digit of the eight is required.

For each different input code, and thus for each code point, there is provided an individual resistance-rectifier combination gate such as G1 . . . G4 which is constituted by a coincidence-of-three gating circuit as are the gates G1, G2, G3, or by a coincidence-of-six circuit as is the gate G4, depending on whether the input code to which it relates is constituted by three code digits or six code digits. Each such gate has three or six input points IP of which one is connected through a resistance and the others through respective rectifiers to the code point for the input code to which the gate pertains: thus the gate G1 has one input point connected to the code point CP1 through a resistance R1 and two other input points connected to that code point through respective rectifiers Rf1 and Rf2. Each code point is connected to eight output points OP for its gating circuit (one for each translation digit) through respective isolating rectifiers RF, and these eight output points OP for each gate are respectively cross-connected over a strapping field TF to the eight translation terminals which relate to the particular values of the digits constituting the translation for the input code concerned. To avoid confusion in illustrating this strapping field (which constitutes the translation field already referred to) cross-connections have been shown for only the output points associated with code point CP1.

In the case of an input code having a unique translation, that is no other input code has the same translation, the eight output points connected to the code point for such designation are provided individually to that point. Where, however, the same translation is pertinent to two or more input codes, for instance where such input code relates to exchanges in a remote area reach via an intermediate exchange to which part of the input code concerned are sent forward for translation there, the code points relating to such input code, for instance CP2 and CP3, may be connected as shown, through respective rectifiers such as Rf3 and Rf4, to what may be termed a route point such as RP itself connected through isolating rectifiers RF to eight output points which as before are cross-connected over the translation field TF to the relevant translation terminals TT; in this way the total number of isolating rectifiers required can be reduced.

In the quiescent state the sixty input terminals IT are all held at the same fixed potential, for example earth. On receipt of the three or six code digits constituting an input code for translation, the three or six input terminals IT relating to the particular values of those digits and included respectively in the groups CG1 . . . CG3 or CG1 . . . CG6 relating to the digits concerned, are marked by changing their potential to another fixed value. The combination of three or six input terminals thus marked, being unique to the received input code, is connected over another strapping field CF to the input points IP of the relevant gating circuit such as G1 . . . G4 and the marking is consequently extended through the gating circuit to the relevant code point such as CP1 . . . CP4.

By way of example the input points IP of the gate G1 associated with the code point CP1 have been shown cross-connected over the strapping field CF to the second input terminal in group CG1, to the third input terminal in group CG2 and to the first input terminal in group CG3 respectively, so that the code point CP1 relates to an exchange designation identified by the three digit input code 231. Similarly the code points CP2 and CP3 relate to the three digit input codes 842 and 863, while code point CP4 relates to the six digit input code 576342. In the translation field TF the cross-connections shown translate the input code 231 into the eight-digit the translation 43225860, assuming that the output points OP pertaining to the code point CP1 are numbered in the order of the translation digits to which they relate.

The manner in which the marking of the input terminals IT is effected in response to receipt of an input code will be referred to again later with regard to FIGS. 6 and 7.

In conformity with the invention each group of translation terminals, TG1 . . . TG0, is to be associated with an individual output circuit including amplifying means which has eight input connections (one per translation digit) extending respectively to the translation terminals TT1 . . . TT8 of the group concerned. The forms of these output circuits illustrated in FIGS. 2–5 will now be described, the groups of translation terminals being repeated at the left hand side of each of these figures.

Referring to FIG. 2, the output circuits together employ eighty saturable reactors SR which correspond respectively to the translation terminals TT and like them are effectively divided into ten equal groups SRG1 . . . SRG0 correspondingly with the groups TG1 . . . TG0 of the translation terminals. Each group of these saturable reactors therefore relates to a particular translation digit value as indicated by the numeral in the group reference and also by the numerical suffix in the reactor references themselves. Likewise the saturable reactors in any one group relate respectively to the eight translation digits, as indicated by the numerical prefixes 1–8 in the reactor references. The figure has been abbreviated by showing only three of the saturable reactor groups SRG1, SRG5 and SRG0, and only the first, fifth and last reactor in each group.

Each saturable reactor SR has an individual control winding CW one end of which is connected to the translation terminal TT to which the reactor corresponds, while the other end is connected to the particular one of the digit selection wires DS1 . . . DS8 which pertains to the particular translation digit to which the reactor concerned relates in its group. For instance the control winding CW of saturable reactor 2SR5 in group SRG5 (which reactor relates to a value five for the second translation digit) is connected between the second terminal TT2 in group TG5 and the digit selection wire DS2 relating to the second translation digit.

As will be realised, each selection wire DS is therefore connected in common to the control windings CW of those saturable reactors SR which relate in their respective groups to different values of one and the same translation digit; that is, wire DS1 is common in this way to the control windings of the first saturable reactors in the several groups, wire DS2 to the control windings of the second reactors, and so on.

The output (A.C.) windings W of the saturable reactors in each group are coupled to a common storage or utilisation circuit element, shown as a cold-cathode electron tube such as VT1 . . . VT0 pertaining to the digit value to which the group relates. There are accordingly a total of ten such elements (only three shown) one for each possible value of a translation digit. Instead of being cold-cathode tubes the storage or utilisation elements could be relays connected similarly to those shown in FIG. 3. In order effectively to isolate the output windings W from each other so as not to impair discrimination in the operation of the saturable reactors constituting a group, the coupling between each such winding W and the associated storage or utilisation circuit element is made by way of a rectifier such as Rf5 connected between such element and the junction point between the output winding W and a load resistance such as R2 therefor.

In operation, the digit selection wires DS1 . . . DS8 are normally held unmarked at a potential which differs from the marked potential of the code points such as CP1 . . . CP4 (FIG. 1) in the same sense as this last potential differs from the unmarked code point potential: in other words if the marking of a code point is effected by raising its potential positively (as will be assumed) the digit selection wires will normally be held even more positive than the code point marking potential. The isolating rectifiers RF (FIG. 1) are poled so as to be backed off by this difference, with the result that, with the selection wire DS for any particular translation digit unmarked, no current will flow through the control windings CW connected in common to such wire, namely the control windings of the saturable reactors SR which relate respectively to the several possible values of that digit. To select a particular translation digit the corresponding selection wire is marked by changing its potential to a value which (taking the above assumption) is more negative than the marking potential of the code points but not more negative than their unmarked potential. Consequently, of the isolating rectifiers RF which are connected to this marked selection wire by way of the translation field TF and the respective control windings of the saturable reactors (one per group) relating to the selected translation digit, those connected to unmarked code points will remain backed off while the one connected to a code point marked in response to a received input code will be rendered conductive. The saturable reactor SR whose control winding CW is connected in series with the conducting isolating rectifier RF, being the saturable reactor which relates to the particular value of the chosen digit of the required translation for the received input code, then responds to the consequent current flow in its control winding to produce an output and apply it to activate the associated storage or utilisation circuit element. The particular circuit element thus activated consequently indicates the value of the selected digit of the translation for the received input code.

To take a particular example which may make the overall operation clearer, assume that input code 231 is received for translation and that the last (eighth) digit of its translation 43225860 is required. The receipt of the input code 231, in the form of positive markings applied to the second input terminal of group CG1, the third input terminal of group CG2, and the first input terminal of group CG3, results in the gate G1 extending this positive marking to the code point CP1. Assuming that the potential of a code point when unmarked is earth, the digit selection wire DS8 for the eighth digit is marked by giving it a potential between earth and the marked code point potential. Consequently since the marked code point CP1 is positive with respect to this selection wire DS8 current is passed by the rectifier RF in the connection extending between them, this connection including the eighth translation terminal TT in group TG0 and the saturable reactor control winding CW connected to that terminal, namely the control winding of saturable reactor 8SR0. This saturable reactor 8SR0 thereupon produces an output which activates the tube VT0 or a relay which may be substituted therefor. Since the other digit selection wires DS1–DS7 remain held at unmarked potentials more positive than the marked code point, these latter potentials back off the rectifiers RF in the connections which extend between the wires DS1 . . . DS7 and the marked code point by way of the other translation terminals in group TG0. Also, since the other (unmarked) code points are at a potential (earth) less positive than that of the marked digit selection wire DS8, the potential on this wire backs off the rectifiers RF in the connections which extend between these code points and the marked selection wire by way of the translation terminals in the groups TG1 . . . TG9. Consequently the control winding CW of saturable reactor 8SR0 is the only one through which current passes and the tube VT0 is therefore uniquely activated to indicate that the value of the requested eighth translation digit of the translation for input code 231 is 0.

In the form of output circuits shown in FIG. 3 the eighty saturable reactors of the FIG. 2 form are replaced by ten saturable reactor SR1 . . . SR0 of which there is one for each possible value of a translation digit and thus one for each of the groups TG1 . . . TG0 of the translation terminals TT. Each of these saturable reactors SR1 . . . SR0, of which only three are shown, has eight control windings such as CW1 . . . CW8 respectively corresponding in each case to the eight translation digits constituting a translation. The control windings CW1

. . . CW8 of each saturable reactor (corresponding to a particular translation digit value) are connected at their one end to the respective translation terminals making up the relevant group TG1 . . . TG0 relating to that value and at their other end to the respective digit selection wires DS1 . . . DS8 for the translation digits to which they relate. The output windings W of the saturable reactors SR1 . . . SR0 are coupled to respective storage or utilisation circuit elements each of which accordingly relates to a particular digit value. These circuit elements have been shown this time as relays RL1 . . . RL0, but they could equally be cold-cathode tubes connected similarly to those in FIG. 2. The operation is generally similar to that of the first embodiment: thus taking the same example as before, the marking of the code point CP1 (FIG. 1) in response to a received input code 231 and the marking of digit selection wire DS8 to indicate which translation digit (the last) is required, have the effect of causing a flow of current exclusively through the saturable reactor control winding which is connected between the marked digit selection wire and a translation terminal cross-connected to the marked code point, namely the control winding CW8 in saturable reactor SR0. This flow of current causes the saturable reactor SR0 to produce an output which activates the associated storage or utilisation circuit element RL0, thereby to indicate that the value of the required eighth digit of the translation for input code 231 is 0.

As will have been appreciated, in the operation of the circuits of both FIG. 2 and FIG. 3 current flows in only one saturable reactor control winding at any time, namely the control winding connected to the translation terminal corresponding to the particular value of the selected translation digit, rather than in all the control windings connected over the strapping field to the marked code point. This has an important advantage in that the power required is correspondingly reduced.

The forms of output circuits shown in FIGS. 4 and 5 correspond broadly to those of FIGS. 2 and 3 respectively but employ pulse transformers instead of saturable reactors. Thus in the form illustrated by FIG. 4, eighty pulse transformers PT (only certain of them being shown) are effectively divided into ten groups of eight, PTG1 . . . PTG0, and have each a single input winding IW correspondingly with the saturable reactros SR in FIG. 2, while in the form illustrated by FIG. 5 there are ten pulse transformers PT1 . . . PT0 each having eight input windings, IW1 . . . IW8, correspondingly with the multiple-control-winding saturable reactors in FIG. 3.

Referring to FIGS. 4 and 5 together for the sake of brevity, each multiple-input-winding pulse transformer PT1 . . . PT0, and likewise each group of single-input-winding transformers PTG1 . . . PTG0, relates to a particular translation digit value. The eight input windings (IW or IW1 . . . IW8) belonging to each transformer group or multiple input winding transformer relate respectively to the different translation digits. The input windings of each transformer PT1 . . . PT0 or group PTG1 . . . PTG0 are connected at their one end to the respective translation terminals TT in the group (TG1 . . . TG0) which corresponds to the same digit value as does that transformer or transformer group concerned: thus the input windings of transformer group PTG1 in FIG. 4, and likewise those of transformer PT1 in FIG. 5 are connected to the respective translation terminals in group TG1, and so on. At their other end the input windings of each multiple-winding transformer and of each transformer group are connected through mutually isolating rectifier means (discussed later) to respective digit selection points P1 . . . P8. Each of these points is multipled with the corresponding points relating to other input windings, one from each other multiple-winding transformer or transformer group, which relate to the same translation digit. Each such multiple, M1 . . . M8, is connected on the one hand through an individual resistance such as R3 to a common source of positive potential and on the other hand through individual capacitors C1 . . . C8 to the digit selection wire DS1 . . . DS8 for the translation digit to which the input windings connected to the multiple pertain.

It is contemplated that in using multiple-input-winding pulse transformers according to FIG. 5, the rectifier means referred to between each input winding and its associated digit selection point P1 . . . P8 may be constituted by two similarly poled series-connected rectifiers such as Rf6, Rf7 of which one is a selenium rectifier having a high back impedance providing for D.C. isolation and the other is a germanium crystal diode providing for pulse isolation. The reason for using these two rectifiers in series is that the selenium type of rectifier usually has a relatively high inherent shunt capacitance which in the absence of the geramnium rectifier, whose inherent capacitance is lower, could permit undesirable pulse application to the associated input winding. For the single-input-winding transformers in FIG. 4, the rectifier means can comprise a single rectifier such as Rf8.

The output windings W' of the multiple-input-winding transformers PT1 . . . PT0 in FIG. 5 are coupled to respective storage or utilisation circuit elements corresponding to the digit values to which the transformers respectively relate, these circuit elements being shown as cold-cathode tubes VT1 . . . VT0 but equally possibly being self-holding relays. Likewise the output windings W' of the single-input-winding transformers in each group PTG1 . . . PTG0 in FIG. 4 are coupled to a storage or utilisation element individual to the group, this element again being either a self-holding relay (RL1 . . . RL0) as shown, or a cold-cathode tube.

The eighty translation terminals TT are coupled through respective capacitances C (which may be provided a least in part by inherent capacitance in the strapping field to these terminals) to a fixed potential, shown as earth, which is different from the marking potential both for the code points such as CP1 . . . CP4 and for the digit selection wires DS1 . . . DS8.

Using these pulse transformers the operation is as follows: Receipt of an input code results as before in the marking of the corresponding code point, and as a result of this marking the capacitances C connected to those translation terminals TT which are themselves connected over the translation field TF to the marked code point, become charged to the marking potential. This potential cannot, however, cause flow of current in the transformer input windings connected to these terminals since the isolating rectifier means such as Rf6—Rf7, or Rf8, in series between the input windings and their digit selection points P1 . . . P8 is backed off by the positive potential presented to these points through the respective resistors such as R3. On selection of a translation digit by marking the appropriate selection wire, the change of potential on the latter is applied over the associated capacitor C1 . . . C8 to bring the relevant one of the points P1 . . . P8 to a potential more negative than the code marking potential, with the result that conduction takes place through the rectifier means concerned and a flow of current is therefore initiated through the transformer input winding connected between the marked code point and the marked selection wire. This input winding will therefore be the one corresponding to the particular value of the selected digit of the required translation. The pulse transformer including this input winding accordingly produces an output pulse to activate the storage or utilisation circuit element coupled to it. The capacitances C connected to the translation terminals TT and charged on marking of a relevant code point again result in a reduction of power required since they provide for the effective accumulation of such power over a period of time.

The marking of the input terminals IT (FIG. 1) of the translating equipment, and also the marking of a digit selection wire DS, may be effected in any suitable manner by a register which on receipt of an input code (usually in the form of dialled pulse trains) requests and receives a translation for that input code, one translation digit at a time. The particular arrangement employed for the marking will depend largely, as does the choice of relays or cold-cathode tubes for the storage or utilisation elements, on whether the exchange employing the translating apparatus is electronic or electro-mechanical in its operation. Two possible arrangements for the marking of the input terminals IT will now be described with reference to FIGS. 6 and 7, in both of which the input terminals IT, in their groups CG1 . . . CG6, are repeated at the right hand side so as to enable these figures to be lined up with FIG. 1.

For an electronic exchange the input terminals IT may be connected (FIG. 6) to the cathodes of respective cold-cathode tubes such as VTM in the register, only some of these tubes being shown. Each of the tubes VT has its cathode also connected to earth through an individual resistance such as R4 so that in the quiescent state, the tubes VTM being non-conducting, the input terminals IT and thus the code points such as CP1 . . . CP4 (FIG. 1) are accordingly held at earth potential. Marking of a combination of input terminals (one from each group) in accordance with the code digit values of a received input code is effected by the relevant cold-cathode tubes assuming a fired (conductive) condition under the stimulus of signals applied to their trigger electrodes over input leads L; for instance the VTM tubes associated with each group of input terminals IT may constitute an electronic counter which counts the dialled pulse train representing the code digit to which that group relates. The marking thus applied to a combination of input terminals IT, and from them to the code point for the received input code, is provided by the now positive cathode potential of the conducting tubes. Still referring to FIG. 6, the positive potential required on the digit selection wires when unmarked is obtained by means of eight further cold-cathode tubes such as VTD (only two shown) having their anodes connected through respective load resistances such as R5 to a positive H.T. supply terminal. The digit selection wires DS1 . . . DS8 are respectively connected to the anode circuits of these tubes either at the anodes themselves, as shown, or at intermediate points in the load resistances such as R5, depending on the magnitude required for marking potential. With these latter tubes such as VTD non-conducting the digit selection wires DS1 . . . DS8 are accordingly held at the positive potential of the H.T. supply. Marking of one of the selection wires is effected by the register by firing the corresponding VTD tube, resulting in the potential of the tube anode, and thus of the selection wire concerned, being changed to a lower value. As previously indicated, it is arranged that the positive marking potential applied to the input terminals IT and from them to the code points is less than the unmarked potential of the digit selection wires, namely the H.T. potential of the cold-cathode tubes VTD associated with these wires, but greater than the marking potential applied to one of these wires when the associated VTD tube is fired.

For an electromechanical exchange, marking of the input terminals IT in response to receipt of an input code may be provided for as illustrated in FIG. 7, by connecting the input terminals IT in each group CG1 . . . CG6 on the one hand through respective resistances such as R6 to earth, and on the other hand through respective selectively operable marking contacts MC, contacts CC, and a common resistance R7 to a source S of positive marking potential. Assume for the moment that the contacts CC whose function will be explained later, are closed. With the marking contacts MC open the input terminals IT are held at earth potential, through the resistances such as R6, but on receipt of an input code and consequent closure of those marking contacts MC which are associated with the input terminals relating respectively to the particular values of the code digits of that input code, these latter terminals, and consequently the corresponding code point, are positively marked by the connection to them of the marking source. The digit selection wires DS1 . . . DS8, are connected through respective resistances R7 to a source of positive blocking potential greater than the marked potential of the input terminals IT. They are also connected through respective selectively operable digit selection contacts DC and further contacts CC to a marking potential (earth) less than the marked potential of the input terminals IT. The marking of a particular digit selection wire to indicate a choice of translation digit is effected by the register closing the relevant DC contact associated with that wire, with the result that, assuming the CC contacts to be closed, the potential applied to the selection wire concerned is reduced to the marking potential from the positive potential applied through resistances R7 when the DC contacts are open.

An exchange may include a number of registers served by a common translating equipment to which they are coupled, one at a time, as required. This commoning of the translator to several registers is indicated in FIG. 7, and also in FIG. 3, by the common symbols (rectangular brackets) *cm*. The contacts CC already referred to are coupling contacts which are provided in each register and are closed when, and only when, the register concerned is coupled, in its turn, to the translating equipment, closure of these contacts rendering the contacts MC and DC in that register effective to control the marking of the input terminals IT and the digit selection wires DS1 . . . DS8. In FIG. 3 further coupling contacts CC are shown which are closed with the contacts CC in FIG. 7 to couple the utilisation or storage relays RL1 . . . RL0 to the output side of the translating equipment, it being appreciated that each register would have similar utilisation or storage elements of its own on which to receive a translation digit.

It will be appreciated that, limited only by the efficiency of the components used for gating and isolation, the various embodiments described can readily be modified to deal with any number of input codes comprising any number of code digits and to provide translations also comprising any number of translation digits: nor need the code or translation digits necessarily be decimal, although this is more usual. Moreover any suitable means of input terminal marking, translation digit selection and translation digit storage or utilisation may be employed and either positive or negative marking potentials may be used provided that the various rectifiers are appropriately poled.

What I claim is:

1. Apparatus for translating input codes each made up of a number of code digits into translations each made up of a number of translation digits, which apparatus comprises a translation cross-connection field, a number of code points at the input side of said field, there being one code point for each different input code, a number of groups of translation terminals at the output side of said field, each group pertaining to a different translation digit value and including a translation terminal in respect to each translation digit capable of having such value, cross-connections in said field affording connection from the code point for any particular input code to each of those translation terminals which correspond to the translation digits of a translation for that input code in the groups pertaining to the respective values of these digits, input circuit means responsive to a received input code to mark the corresponding code point, and a plurality of output circuits, one for each said group of translation terminals, provided externally of said field on its output side, each including amplifying means having input connections individually extending thereto from the several translation terminals in the appertaining group, together with means for selectively inhibiting all of said amplifier input connections except those connected to translation terminals relating to a particular translation digit required at any time, whereby on receipt of an input code for translation an output will be obtained only from the amplifying means then having an uninhibited input connection from a marked translation terminal, which output accordingly represents the value of the required translation digit.

2. Translating apparatus as claimed in claim 1 employing pulse responsive amplifying means in said output circuits and including capacitance provided between each translation terminal and a point of potential different from the code point marking potential.

3. Apparatus for translating digital input codes into corresponding digital translations, comprising a translation cross-connection field, a number of code points at the input side of said field, there being one code point for each different input code, a number of groups of translation terminals at the output side of said field, each group pertaining to a different translation digit value and including a translation terminal in respect of each translation digit capable of having such value, and cross-connections in said field affording connection from the code point for any particular input code to each of those translation terminals which correspond to the digits of a translation for that input code in the groups pertaining to the respective values of these digits, together with input circuit means responsive to a received input code to mark the corresponding code point, and a plurality of output circuits, one for each group of translation terminals, provided externally of said field on its output side, including respective current amplifying means each incorporating a device of the kind represented by pulse transformers and saturable reactors, which device is provided with a plurality of input windings having connections thereto from the respective translation terminals in the group to which the device is related, said input windings being included with said connections in circuits appropriate to each such winding being energised to produce an output from the device including it only when a marking is present at its associated translation terminal, such output thereby representing the translation digit and the value thereof to which that therminal relates.

4. Apparatus for translating digital input codes into corresponding digital translations comprising a translation cross-connection field, a number of code points at the input side of said field, there being one code point for each different input code, a number of groups of translation terminals at the output side of said field, each group pertaining to a different translation digit value and including a translation terminal in respect of each translation digit capable of having such value, and cross-connections in said field affording connection from the code point for any particular input code to each of those translation terminals which correspond to the digits of a translation for that input code in the groups pertaining to the respective values of these digits, together with input circuit means responsive to a received input code to mark the corresponding code point, and a plurality of output circuits, one for each group of translation terminals, provided externally of said field on its output side, each including current amplifying means incorporating a group of devices of the kind represented by saturable reactors and pulse transformers, which devices have respective input windings with connections thereto from the respective translation terminals in the terminal group to which the pertinent output circuit is related, said input windings being included with their said connections in circuits appropriate to each such winding being energised to produce an output from its amplifying device only when a marking is present at its associated translation terminal, such output thereby representing the translation digit and the value thereof to which that terminal relates.

5. Apparatus for translating digital input codes into corresponding digital translations, comprising a translation cross-connection field, a number of code points at the input side of said field, there being one code point for each different input code, a number of groups of translation terminals at the output side of said field, each group pertaining to a different translation digit value and including a translation terminal in respect of each translation digit capable of having such value, and cross-connections in said field affording connection from the code point for any particular input code to each of those translation terminals which correspond to the digits of a translation for that input code in the groups pertaining to the respective values of these digits, together with input circuit means responsive to a received input code to mark the corresponding code point, and a plurality of output circuits, one for each group of translation terminals, including respective current amplifying means each incorporating at least one device of the kind represented by saturable reactors and pulse transformers, which devices of the several amplifying means together provide a plurality of input windings having respective connections thereto from the translation terminals and included with said connections in circuits appropriate to each such winding being energised to produce an output from the device including it only when a marking is present at its associated translation terminal, the translating apparatus including rectifying means in said input winding circuits and also including, for permitting a translation to be obtained one digit at a time, means for selectively backing off the rectifying means in circuit with those input windings which are connected to translation terminals relating to translation digits other than a particular digit required, whereby in response to a received input code, current will flow only in that one of the remaining input windings which is connected to a marked translation terminal.

6. Translating apparatus as claimed in claim 4 wherein each said circuit including one of said input windings and rectifying means extends between a code point connected over the translation field to the translation terminal to which the winding is connected and a digit selection wire relative to the translation digit to which that terminal relates, means being provided for selecting the potential on each digit selection wire to have one of two values in relation to the marked code point marking potential, namely a first value which differs from the code point marking potential in the same sense as this last potential differs from the unmarked code point potential, the said rectifying means being poled so as to be backed off by the difference, and a second, marked, value between the marked and unmarked code point potential.

References Cited in the file of this patent

UNITED STATES PATENTS

| | | |
|---|---|---|
| 2,518,022 | Keister | Aug. 8, 1950 |
| 2,657,272 | Dimond | Oct. 27, 1953 |

OTHER REFERENCES

Bell Telephone System Technical Publication, Monograph 1908, p. 38, 1951.

Schneckloth: "Translators," 1951, 38 pp., Bell Telephone Monograph 1908.